United States Patent

[11] 3,559,714

[72] Inventor Henri Verdier
 Puy-de-Dome, France
[21] Appl. No. 748,472
[22] Filed July 29, 1968
[45] Patented Feb. 2, 1971
[73] Assignee Compagnie Generale des Etablissements
 Michelin, raison sociale Michelin & Cie
 Clermont-Ferrand, Puy-de-Dome, France
[32] Priority July 27, 1967, May 16, 1968
[33] France
[31] 116,031 and 152,128

[54] TIRE COVERS
 4 Claims, 3 Drawing Figs.
[52] U.S. Cl. ............................................. 152/361
[51] Int. Cl. ............................................. B60c 9/10

[50] Field of Search............................................. 152/361,
 354, 356, 359

[56] References Cited
 UNITED STATES PATENTS
 3,357,470 12/1967 Massoubre ............... 152/361
 3,404,721 10/1968 Massoubre ............... 152/361

Primary Examiner—James B. Marbert
Attorney—Brumbaugh, Graves, Donohue & Raymond

ABSTRACT: A tire having bold tread moldings and crown plies underneath the moldings is provided with at least one additional ply at each edge of the crown plies. The additional plies are formed of cords which are extensible, which contract in heat, and which extend in the tire in a substantially longitudinal direction.

INVENTOR.
HENRY VERDIER
BY
Brumbaugh, Graves, Donohue & Raymond
his ATTORNEYS

TIRE COVERS

BACKGROUND OF THE INVENTION

The present invention relates to tire covers, especially radial carcass covers provided with a tread which has "bold" moldings. By bold moldings are understood moldings comprising reliefs of considerable height widely spaced apart, such as seen frequently in tire covers intended for travel over loose ground and used, for example, on agricultural and forestry tractors and on certain public works equipment.

In general, the moldings of the tire tread are shaped by molding an unvulcanized cover which is provided with a smooth tread. This is done in a curing mold by a fluid under pressure whereby the tire is inflated by means of a curing chamber or a membrane.

When the moldings are not bold, the impressing of the recesses in the tread and the formation of the reliefs by extrusion of the crude rubber are obtained without noteworthy deformation or displacement of the carcass and the reinforcement directly underneath. The situation is different for bold moldings, since, in the course of shaping of these moldings, the reliefs of the mold produce a marked punching effect on the carcass cover and the tread reinforcement which causes deformation or displacement of such carcass and/or such reinforcement, not only underneath the tread but sometimes also in the sidewalls of the cover.

This is the reason why tires with bold moldings frequently show an undulating inner surface with alternating recesses and protrusions corresponding to the rubber blocks of the moldings and to the intervals separating them. This phenomenon is especially pronounced in radial carcass covers, inasmuch as this kind of carcass offers less resistance to deformation prior to vulcanization, especially when the spaces separating the rubber blocks of the molding have themselves a radial direction. In this case, a deformation of the sidewalls resembling a ribbed melon may occur, the sidewalls following the displacement of the carcass wires and having reliefs and recesses which are visible on the outer surface and run in a radial direction.

Apart from the surface deformations, the shaping of bold moldings may bring about localized displacements of the reinforcing cords, especially in the tread reinforcement. It may happen that the edges of the plies which form this reinforcement rise in the direction of the tread and thus come to be placed in a location where they are more exposed to separation from one another.

SUMMARY OF THE INVENTION

The aim of the present invention is the elimination, or at least the lessening, of the displacements and deformations of the carcass and the tread reinforcement which, in conventional tires, result from using bold moldings, mainly as far as radial carcass tires are concerned. Another aim of the invention is the elimination of formal defects of the inner or outer surface of such tires.

The tires in accordance with the invention, with bold moldings, are characterized in that they comprise, underneath the tread and preferably between the tread and the crown plies, in the regions of the width of the tread affected by the bold moldings, and at least in the regions of the edges of the crown plies, a minimum of one ply of extensible wires or cords that contract when hot and that run in a longitudinal or substantially longitudinal direction.

BRIEF DESCRIPTION OF THE DRAWING

An understanding of additional aspects of the invention may be gained from a consideration of the following detailed description of several representative embodiments thereof, taken in conjunction with the accompanying FIGS. of the drawing, wherein.

DESCRIPTION OF THE PREFERRED EMBODIMENTS

Figure 1:
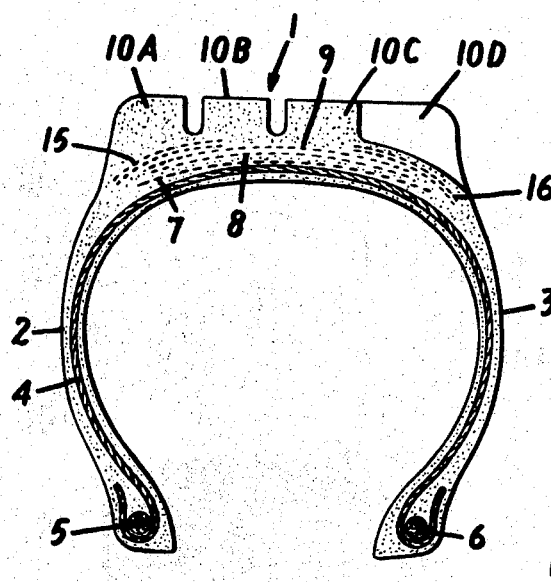
FIG. 1 is a radial cross section of a tire in accordance with the invention.

Some synthetic fibers have the characteristic of contracting when hot. If a polyamide, polyester or polyvinyl alcohol cord is heated, for example, to a temperature ranging around 100 to 150° C., there occurs a contraction, a shrinking of the cord which apparently is due to a modification of the direction of the molecular chains. This shrinking is partly retained on cooling. Among the fibers which contract in heat, mention should be made above all the polyamides, especially nylon, the polyesters, especially Dacron (a registered trademark of E. I. du Pont de Nemours Co.), and the polyvinyl alcohols. The following table shows for various cords the force of contraction in grams and the percentage of contraction observed at a temperature of 150° C., i.e., at a temperature of the order of the tire vulcanizing temperature.

| Cord (kind, number of deniers, number of strands) | Contractile force in g. | Contraction, percent |
| --- | --- | --- |
| Nylon 66 polyamide, raw, 840×3 | 605 | 7.0 |
| Nylon 66 polyamide, treated, 840×3 | 890 | 7.1 |
| Nylon 66 polyamide, treated, 1,680×2 | 925 | 5.8 |
| Dacron polyester, treated, 1,100×3 | 525–575 | 3.1–3.6 |

The placement of longitudinal wires that contract under high tension when hot in the areas in which the tread is subjected to considerable deformations prevents deformations from being propagated into the reinforcement and the carcass directly underneath.

On the one hand, the extensibility of these wires does not interfere with the structure or the normal shaping of the reinforcement. Yet, the contracting of these wires at the beginning of vulcanization, when the rubber is still plastic, corrects the deformations which would otherwise occur, by levelling the recesses and reliefs.

Although it is preferable to use wires which are placed longitudinally and wind once or several times around the cover, so that the contraction occurring when hot can produce a maximum hoop effect, experience has shown that the use of wires arranged rigorously parallel to the median plane can under certain circumstances bring about a deformation of the carcass in radial cross section. This is because the wires parallel to the median plane and winding around the cover once or several times are necessarily of great length, a fact that produces an excessive hoop effect.

It is therefore advisable to limit the length of the extensible wires contracting when hot and running in a longitudinal or substantially longitudinal direction to a range between 0.20 m. and 2 m.

In accordance with one embodiment, one uses wires which run parallel or substantially parallel to the median plane but which extend only over a part of the circumference of the tire.

In accordance with another embodiment, the wires or cords of the plies provided in accordance with the invention form with the longitudinal direction an angle which may be as large as approximately 15°.

It is desirable that the additional plies be placed in such a manner that they cover the edges of all the plies constituting the reinforcement of the tread. However, a noticeable favorable effect is obtained if the additional plies cover the ends of some of the plies of the tread reinforcement.

The wires or cords of the additional plies that contract when hot can be used regardless of the kind and direction of the wires or cords of the carcass and of the tread reinforcement (metal, natural textile, artificial or synthetic textile, radial or crossed carcass).

The FIGS. show a tire comprising a tread 1 and sidewalls 2 and 3. The tire comprises a carcass ply 4 which is rolled around bead wires 5 and 6 and which consists of cords arranged in radial planes, and a tread reinforcement comprising three superimposed plies 7, 8, 9 of metal cords positioned between the tread 1 and the carcass 4.

The tread 1 comprises crosswise ribs or ridges 10 and 11 arranged in an offset pattern and comprising respectively rubber blocks 10A, 10B, 10C and 11A, 11B, 11C, separated by longitudinal cutouts such as 12. The ribs 10 and 11 are separated in a circumferential direction by crosswise cutouts, such as 13. The ribs 10 and 11 start at one edge of the tread and stop at a given distance from the other edge and thus extend only over approximately three-fourths of the width of the tread. The ribs 10 and 11 consequently are accompanied in a transverse direction by a recessed portion 10D or 11D alternatingly on either side of the tread. The formation of the recesses 10D and 11D and of the adjacent blocks 11A or 10A renders the molding bold, enabling it better to cling to the ground. However, but for the present invention, it would cause deformations and displacements of the cords of the plies 4, 7, 8 and 9, and the inner surface of the tire underneath the tread 1 and the inner and outer surfaces of the sidewalls 2 and 3 would become undulated.

In order to avoid this disadvantage, there are placed between the tread 1 and the plies 7, 8, 9, in the zones corresponding substantially to the recesses 10D and 11D, longitudinal nylon wires 15 and 16 which wind twice around the cover.

Figure 2:
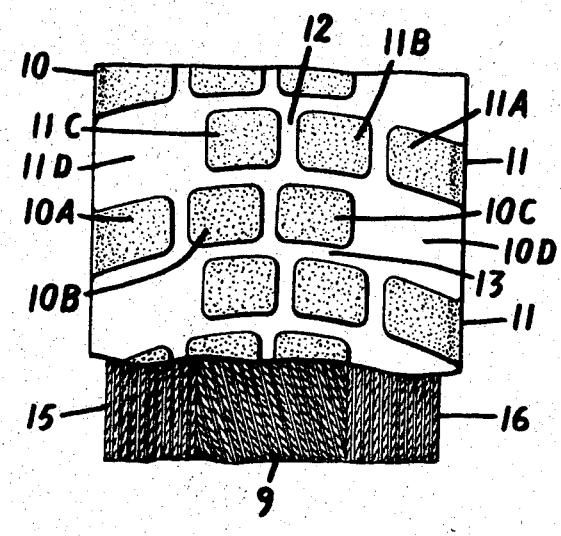
FIG. 2 is a plan view, partly broken away, of the tire of FIG. 1 on the same scale as FIG. 1.

As an example, for a 12.5 by 20 tire provided with a molding similar to that shown in FIG. 2 and having a carcass ply 4 and crown reinforcement 7, 8, 9 consisting of metal cords, one uses 1,680 by 2 nylon cord. These specially treated cords have a contraction force of approximately 1,500 g. per cord. They are placed practically contiguously in the plies 15 and 16. The mean amplitude of the recesses and of the protrusions inside the tire, which was 12.8 mm. in a tire without the plies 15 and 16, was reduced to 1.2 mm. in a tire provided with these plies. The plies of the tread reinforcement and of the carcass are thus arranged over surfaces which are practically surfaces of revolution, in spite of the bold character of the molding. Furthermore, the deformation of the sidewalls into melon ribs completely disappears.

Figure 3:
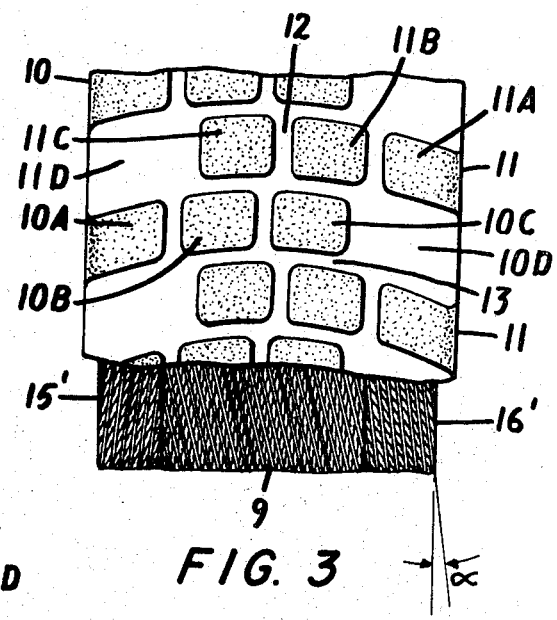
FIG. 3 is a view similar to FIG. 2 but showing an alternate embodiment of the invention.

In an 18 by 19.5 tire with a tread reinforcement comprising two plies 8 and 9 having a width of close to 350 mm., one uses two additional plies 15' and two additional plies 16' (FIG. 3) each having a width of approximately 80 mm. and consisting of 840 by 3 polyamide cords arranged so as to form an angle $\alpha$ of 5° with the longitudinal direction. The cores of the two plies 15' as well as those of 16' are crossed. They have a length of approximately 1 m. and a contractile force of approximately 750 g. per cord. Owing to these plies, the profile of the radial cross section of the carcass is regular and the circumferential cross section is free from appreciable undulations.

I claim:

1. A tire comprising a tread formed with bold moldings including large blocks separated by wide and deep transverse grooves for improved traction on loose ground, crown plies underneath said moldings, and at least one additional ply in the region of each edge of said crown plies, said additional plies extending underneath said bold moldings and being formed of cords which are extensible, which contract in heat, and which extend in said tire in a substantially longitudinal direction, the contracting property of said additional plies preventing the forming of undulations in said tire under said bold moldings during the forming of said tread.

2. A tire according to claim 1 wherein said additional plies are between said tread and said crown plies.

3. A tire according to claim 1 wherein said cords are of a length which ranges from 0.20 meters to 2 meters and form with the longitudinal direction an angle not exceeding 15°.

4. A tire according to claim 1 wherein said tire comprises a carcass having radially extending cords.